United States Patent
Ishii et al.

(10) Patent No.: US 6,751,542 B2
(45) Date of Patent: Jun. 15, 2004

(54) CORRECTIVE CONTROL SYSTEM AND METHOD FOR LIQUID PRESSURE CONTROL APPARATUS IN AUTOMATIC TRANSMISSION

(75) Inventors: Shigeru Ishii, Kanagawa (JP); Masashi Sugiuchi, Yokohama (JP); Tatsuaki Eguchi, Kanagawa (JP); Hisao Nobu, Kanagawa (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/400,667

(22) Filed: Mar. 28, 2003

(65) Prior Publication Data

US 2003/0187562 A1 Oct. 2, 2003

(30) Foreign Application Priority Data

Mar. 29, 2002 (JP) .......................... 2002-096395
Mar. 29, 2002 (JP) .......................... 2002-096396

(51) Int. Cl.$^7$ ................................. G06F 7/00
(52) U.S. Cl. ..................... 701/51; 701/56; 180/337; 477/32
(58) Field of Search ................. 701/51, 56; 180/165, 180/337; 123/1 R; 477/7, 32

(56) References Cited

U.S. PATENT DOCUMENTS 5,950,595 A * 9/1999 Yoshioka et al. ........... 123/295
2003/0183280 A1 10/2003 Ishii et al.

FOREIGN PATENT DOCUMENTS

JP 2001-116130 A 4/2001

* cited by examiner

Primary Examiner—William A. Cuchlinski, Jr.
Assistant Examiner—Olga Hernandez
(74) Attorney, Agent, or Firm—Foley & Lardner LLP

(57) ABSTRACT

In corrective control system and method for a liquid pressure control apparatus for a control valve unit, fundamental maps are preset on the basis of a hysterisis characteristic, the hysterisis characteristic being exhibited in such a manner that an output liquid pressure actually measured value which takes along a first hysterisis loop when the current value is increased toward a larger value is different from that which takes along a second hysterisis loop when the current value is, in turn, decreased toward a smaller value from the larger value and each fundamental map is a map representing a relationship between the output liquid pressure actually measured value and a current average value, the current average value being an average between the current value in the first hysterisis loop and that in the second hysterisis loop with respect to each of the same output pressure actually measured values.

18 Claims, 6 Drawing Sheets

FUNDAMENTAL MAP

FIG.4
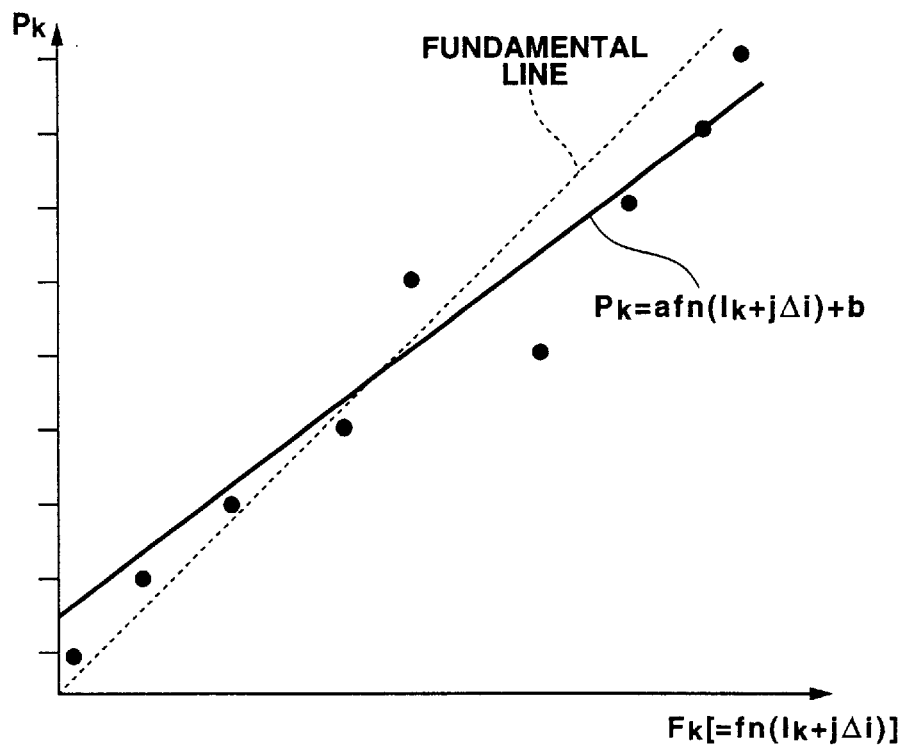
FIG.5A
FIG.5B
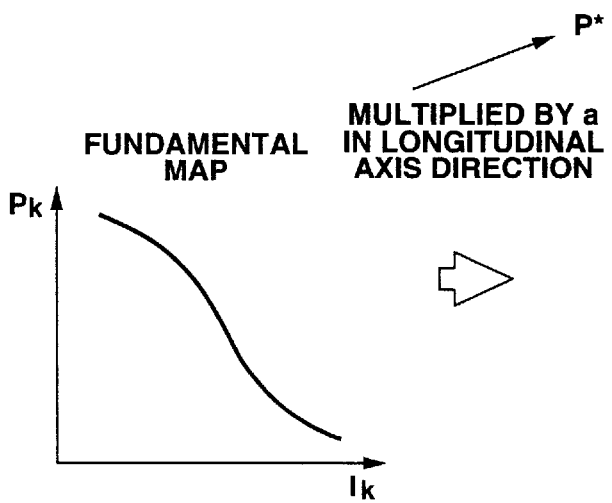
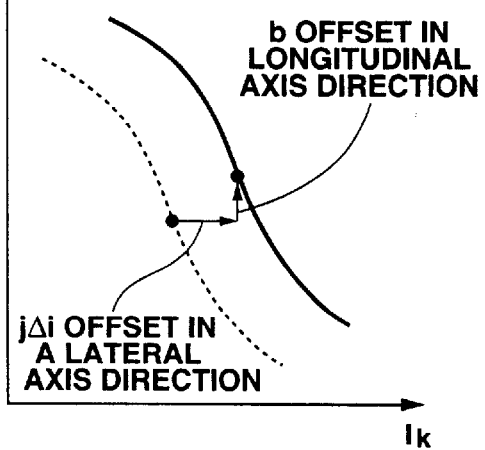

CORRECTIVE CONTROL SYSTEM AND METHOD FOR LIQUID PRESSURE CONTROL APPARATUS IN AUTOMATIC TRANSMISSION

BACKGROUND OF THE INVENTION

1. Field of the Invention

The present invention relates generally to corrective control system and method for a liquid pressure control apparatus in, for example, a vehicular automatic transmission which accurately control an output liquid pressure in accordance with a value of an electrical signal and, more particularly, relates to the corrective control system and method which control correctively the output liquid pressure of a control valve unit equipped within the vehicular automatic transmission.

2. Description of the Related Art

In the control valve unit of the vehicular automatic transmission, the electrical signal is used to drive a solenoid so as to produce a signal pressure in accordance with the electrical signal. This signal pressure is used to make a gear shift by controlling a clutch pressure of a frictional element which is the output liquid pressure and a line pressure which is an original pressure of the clutch pressure of the frictional element. At this time, due to a variation in a circuit resistance and a difference in performance between the individual products of frictional elements and solenoids, a relationship between the electrical signal for driving the solenoid and the output liquid pressure cannot accurately be obtained. Both of a shift shock and a response delay in the gear shift easily occur. Thus, desired action and advantages cannot accurately be obtained.

A Japanese Patent Application First Publication No. 2001-116130 published on Apr. 27, 2001 exemplifies a previously proposed corrective control system for a liquid pressure control apparatus in which an actual relationship between the electrical signal for the drive of the solenoid and the output liquid pressure due to the variation in the circuit resistance and difference in performance between individual products of frictional elements and solenoids is compared with each of a plurality of prepared maps having various characteristics. By selecting one of the maps which is least deviation from the actual relationship, an accuracy in the relationship between the solenoid drive electrical signal and the output liquid pressure is improved and an improvement in a controllability can be achieved. Specifically, the actual output pressures with respect to the electrical signals at a plurality of points preset are measured. Thereafter, with a lateral axis as output values on the map and with a longitudinal axis as an actual output liquid pressure, the actual output liquid pressures are plotted. The plotted values are approximated to a first-order function through a least square method. This approximated first-order function has a gradient (gain) and a constant term (offset). These gradient value and constant term are stored. Then, during an actual control procedure, a target output liquid pressure is substituted into the longitudinal axis to calculate an instantaneous map output (liquid) pressure from the stored gain and offset values.

FIG. 7 shows a structure for creating the output liquid pressure which is the clutching pressure of a certain frictional element (or brake) of the automatic transmission from the signal pressure that a solenoid outputs. The previously proposed liquid pressure control apparatus includes: a solenoid valve 40 which creates a spool pilot pressure $P_{S\text{-}PLT}$ from a pilot pressure $P_{PLT}$ and a spool valve 50 outputting a liquid supply pressure P for the frictional element or the brake from line pressure PL which is the spool supply pressure according to the spool pilot pressure $P_{S\text{-}PLT}$. In solenoid valve 40, a movement quantity of a plunger 42 is increased in accordance with a supply current value. A spherical ball 43 is moved which, for example, interrupts pilot pressure $P_{PLT}$ and spool pilot pressure $P_{S\text{-}PLT}$ so that a flow passage 44 is opened. Then, pilot pressure $P_{PLT}$ is communicated with spool pilot pressure $P_{S\text{-}PLT}$ so that a spool pilot pressure $P_{S\text{-}PLT}$ is increased. On the other hand, in spool valve 50, a spool supply pressure (line pressure valve) is communicated with a frictional element. This spool 51 is moved together with a pressure increase in spool pilot pressure $P_{S\text{-}PLT}$ opposed against spool spring 52 and the flow passage is closed so that line pressure PL which is the spool supply pressure reduces the frictional element supplying pressure. Hence, when a current value caused to flow through solenoid valve 40 is large, spool pilot pressure $P_{S\text{-}PLT}$ and frictional element supplying pressure P is decreased linearly.

In the case of the solenoid valve described above, an output (liquid) pressure characteristic is exhibited which is different from spool pilot pressure $P_{S\text{-}PLT}$ which is an output (liquid) pressure of the solenoid due to the characteristic of a spool spring 52. FIG. 6 shows characteristic graphs representing a static characteristic of the relationship between the drive current to the solenoid and output liquid pressure. As shown in FIG. 6, a, so-called, hysterisis characteristic is exhibited between the drive current and the output liquid pressure. Hence, the prepared map is used which is an average output liquid pressure value at each current value from a static characteristic as denoted by a dot line shown in FIG. 6.

SUMMARY OF THE INVENTION

However, a deviation of the average output liquid pressure prepared map for each spaced apart current value described above from the actual output (liquid) pressure characteristic occurs and a worsening of the controllability will be introduced. Especially, in a region of the hysterisis characteristic (a nonlinear characteristic region) in which the current value is large but the output liquid pressure is small, a point of inflection is shifted toward a higher output (liquid) pressure side than an actual characteristic thereof. For example, in a case where the current value is raised and, in a midway through a remarkable rise of the current value, the current value is once reduced, the output (liquid) pressure is lowered and follows along a loop of a current rise side (refer to FIG. 6) (hereinafter, referred to a first hysterisis loop) of a hysterisis curve is the static characteristic of the actual output (liquid) pressure and, thereafter, when the current value is lowered, the output (liquid) pressure does not follow along a second hysterisis loop of a current value reduction side (output (liquid) pressure rise side) but traces a value of the output line pressure shifted toward a lower output (liquid) pressure side. Especially, such a phenomenon as described above becomes remarkable in such a hysterisis characteristic that when the output pressure is, at a stroke, reduced in accordance with the increase in the current value and when the output pressure is, at the stroke, increased in accordance with the decrease in the current value.

In addition, in the above-described Japanese Patent Application First Publication, it is possible to accurately correct the current value of the electrical signal to drive the solenoid in a case where the electrical signal is supplied to such a control valve unit as to have a similarity characteristic as any one of the plurality of prepared (preset) maps having the various characteristics and have a characteristic of the current value shifted toward an output pressure increase direction. However, the correction of the current value is not carried out in a case where the electrical signal is supplied to such a control valve unit as to have the similarity characteristic as any one of the maps and have a characteristic of the current value shifted toward a current value increase direction. However, a sufficient correction value cannot be obtained. Hence, it may be considered that a high-order function can be used to approximate the relationship between the output (liquid) pressure actually measured value and the output pressure actually measured value and the output pressure threshold value in place of, for example, a least square method. However, a calculation burden is large and is not practical. In addition, it may be considered that maps are newly added. However, a memory capacity by the number of maps added is needed to be increased and the manufacturing cost is accordingly increased.

It is, hence, an object of the present invention to provide corrective control system and method for a liquid pressure control apparatus which are capable of improving the controllability even if a large hysterisis occurs between the electrical signal and output pressure caused by performance deviations in a liquid pressure circuit and solenoid of the control valve unit and are capable of compensating the deviation with a small memory capacity even if the deviation caused by the above-described deviation of characteristic in liquid pressure circuit resistance and the individual performance difference of the products described above.

The above-described object can be achieved by providing a corrective control system for a liquid pressure control apparatus of a control valve unit, comprising: a liquid pressure controlling section that controls an output liquid pressure of the control valve unit on the basis of a current value which is an electrical signal generated in accordance with an output pressure demand value P* determined according to a calculation process executed within a control unit; an output liquid pressure actually measuring section that outputs respectively separated current values to a solenoid drive circuit of the control valve unit and actually measures the output liquid pressure values for the outputted respective current values; an output pressure theoretical value calculating section that calculates an output liquid pressure theoretical value for each of the current values outputted by the actually measuring section by referring to preset fundamental maps, each fundamental map representing a relationship between the current value and the output liquid pressure theoretical value; fundamental map presetting section that presets the fundamental maps on the basis of a hysterisis characteristic that each individual control valve unit has, the hysterisis characteristic being exhibited in such a manner that the output liquid pressure actually measured value which takes along a first hysterisis loop when the current value is increased toward a larger value is different from that which takes along a second hysterisis loop when the current value is, in turn, decreased toward a smaller value from the larger value; a corrective term calculating section that approximates a relationship between the output liquid pressure actually measured value and the output liquid pressure theoretical value for each of the same current values to a first-order function and calculates a coefficient of the approximated first-order function and a constant thereof; a storing section that stores the calculated coefficient and constant therein; and a correcting section that corrects the electrical signal which accords with the output liquid pressure demand value on the basis of the coefficient and constant stored in the storing section, wherein each of the fundamental maps referred to by the output liquid pressure theoretical value calculating section is a map representing a relationship between the output liquid pressure actually measured value and a current average value, the current average value being calculated to be an average of the current between the current value in the first hysterisis loop of the hysterisis characteristic and that in the second hysterisis loop thereof with respect to each of the same output pressure actually measured values.

The above-described object can also be achieved by providing corrective control method for a liquid pressure control apparatus for a control valve unit, comprising: controlling an output liquid pressure of the control valve unit on the basis of a current value which is an electrical signal generated in accordance with an output pressure demand value P* determined according to a calculation process executed within a control unit; outputting respectively separated current values to a solenoid drive circuit of the control valve unit; actually measuring the output liquid pressure values for the outputted respective current values; calculating an output liquid pressure theoretical value for each of the outputted current values by referring to preset fundamental maps, each fundamental map representing a relationship between the current value and the output liquid pressure theoretical value; presetting the fundamental maps on the basis of a hysterisis characteristic that each individual control valve unit has, the hysterisis characteristic being exhibited in such a manner that the output liquid pressure actually measured value which follows along a first hysterisis loop when the current value is increased toward a larger value is different from that which follows along a second hysterisis loop when the current value is, in turn, decreased toward a smaller value from the larger value; approximating a relationship between the output liquid pressure actually measured value and the output liquid pressure theoretical value for each of the same current values to a first-order function; calculating a coefficient of the approximated first-order function and a constant thereof; storing the calculated coefficient and constant therein; and correcting the electrical signal which accords with the output liquid pressure demand value on the basis of the stored coefficient and constant, wherein each of the fundamental maps to be referred to when calculating the output liquid pressure theoretical value is a map representing a relationship between the output liquid pressure actually measured value and a current average value, the current average value being calculated to be an average of the current between the current value in the first hysterisis loop of the hysterisis characteristic and that in the second hysterisis loop thereof with respect to each of the same output pressure actually measured values.

This summary of the invention does not necessarily describe all necessary features so that the invention may also be a sub-combination of these described features.

BRIEF DESCRIPTION OF THE DRAWINGS

FIG. 4 is a plotted graph of output pressure actually measured value for calculating a gain value and an offset value using a least square method.

FIGS. 5A and 5B are graphs representing the fundamental map used in the corrective control unit shown in FIG. 1 and a corrected fundamental map corrected with corrective terms.

DETAILED DESCRIPTION OF THE PREFERRED EMBODIMENTS

Reference will hereinafter be made to the drawings in order to facilitate a better understanding of the present invention.

(First Embodiment)

Figure 1:
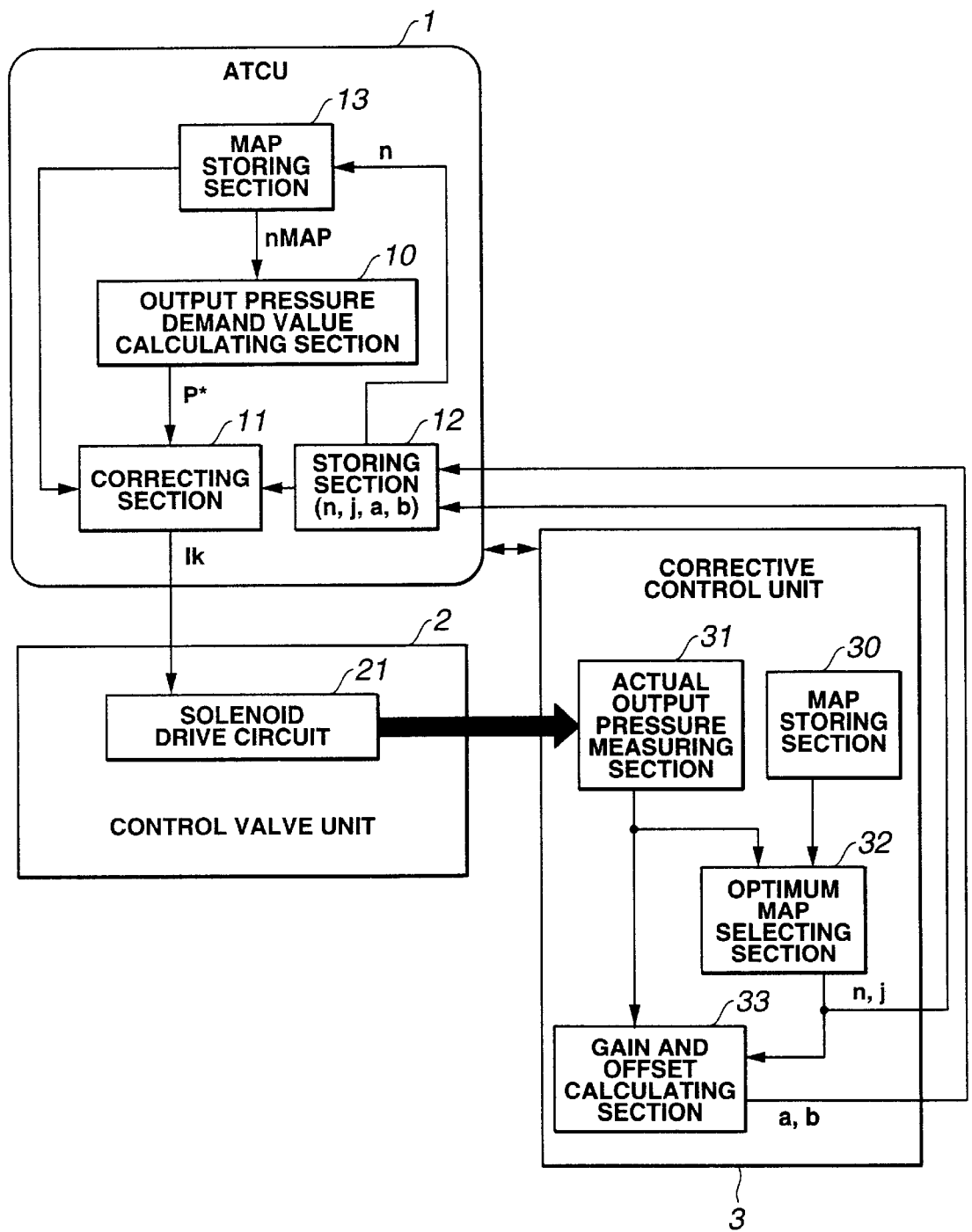
FIG. 1 is a functional block diagram of a corrective control unit communicated with an automatic transmission control unit supplying an electrical signal to a control valve unit of an automatic transmission to which a corrective control system in a first preferred embodiment according to the present invention is applicable.

FIG. 1 shows a whole functional block diagram of a corrective control system for a liquid pressure control apparatus of a control valve unit 2 in a first preferred embodiment according to the present invention.

In FIG. 1, an automatic transmission control unit (ATCU) 1 which outputs a control current (current value Ik) to a control valve unit 2 (specifically, a solenoid drive circuit 21) of the automatic transmission. In addition, automatic transmission control unit (ATCU) 1 outputs a gear shift control command to the automatic transmission and includes: an output (liquid) pressure demand value calculating section 10; a correcting section 11; a storing section 12; and a map storing section 13.

Output (liquid) pressure demand value calculating section 10 inputs the information to perform a liquid pressure corrective control and calculates an output pressure demand value P* on the basis of the input information of ATCU 1. It is noted that output (liquid) pressure demand value calculating section 10 calculates and outputs the output (liquid) pressure demand value P* in accordance with a running state after the corrective control for the liquid pressure (as will be described later) has been carried out. Storing section 12 stores the corrective information (n, j, a, b) as will be described later. It is noted that n and j denotes arbitrary integers. It is noted that, after the end of the corrective control, a fundamental map selected on the basis of a map information n outputted from storing section 12 to map storing section 13 is outputted to correcting section 11. The selected fundamental map is corrected on the basis of the corrective information outputted from storing section 13. Correcting section 11 calculates the current value I on the basis of output pressure demand value P* based on the corrected fundamental map (as will be described later) and outputs the calculated current value Ik to solenoid drive circuit 21.

The fundamental maps stored by map storing section 13 will herein be explained.

Figure 6:
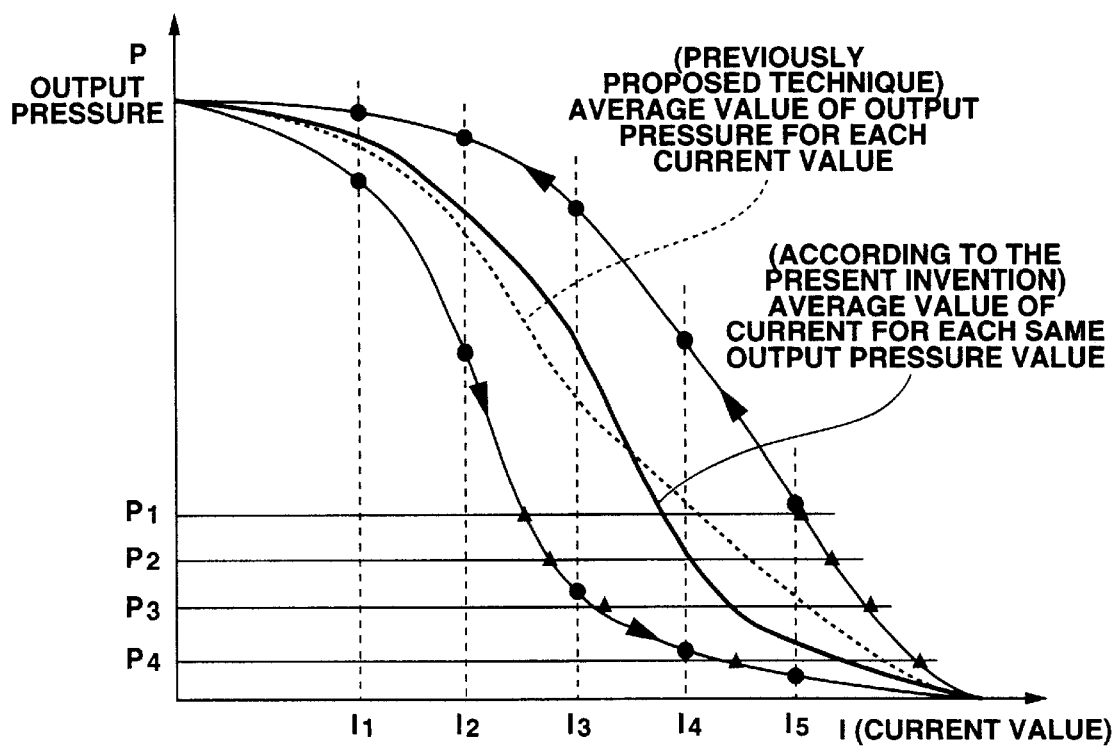
FIG. 6 is a hydraulic pressure plotted graph representing a relationship between an output (liquid) pressure and a current value in the first embodiment of the corrective control system shown in FIG. 1.
Figure 7:
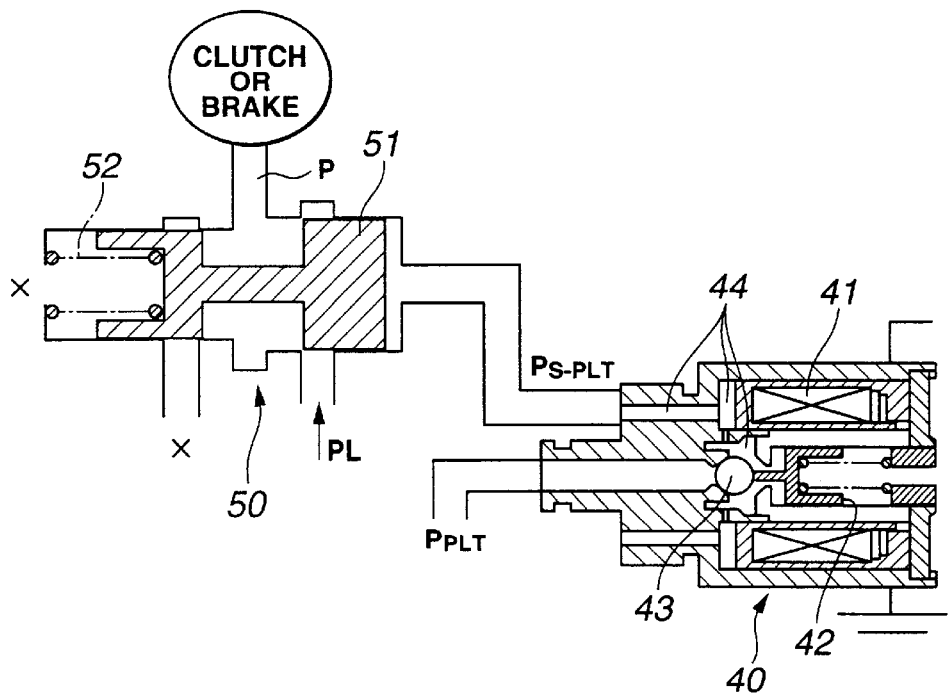
FIG. 7 is a rough view of a structure of a liquid pressure control apparatus for creating the output pressure which is a clutching pressure of a frictional element from a signal pressure outputted by an electromagnetic linear solenoid of the control valve unit to which the control system according to the present invention is applicable.

FIG. 6 shows a method of presetting the fundamental map in the above-described first embodiment as compared with the case of the previously proposed liquid pressure control apparatus described in the BACKGROUND OF THE INVENTION.

An output pressure P (or called an output liquid pressure but, hereinafter, also referred to the output pressure) is decreased along with a rise in current value I outputted to solenoid drive circuit 21 and output pressure P is raised along with the decrease in current value I. At this time, the decrease and increase in output pressure P have the hysterisis following different routes (first and second hysterisis loops). For example, as denoted by a thin solid line with arrow marks of FIG. 6, suppose that output pressure P is lowered, at the stroke, due to the increase in current value I and output pressure P is, at the stroke, raised due to the decrease in current value I. At this time, when the fundamental map is preset, current value rise side output pressure (output liquid pressure Pk along the first hysterisis loop) and current value lowered side pressure (output liquid pressure Pk along the second hysterisis loop) is measured for each of the same current values Ik and an average output pressure thereof is set to the fundamental map. Consequently, the fundamental map indicates a curved line denoted by a dot line shown in FIG. 6. In this case, the average output liquid pressure as the fundamental map is shifted toward a higher output pressure side as compared with the characteristic of output pressure P with respect to actual current value I. Especially, since the fundamental map described above is shifted largely toward the higher output pressure side when output pressure value is in a range of lower output pressure values, the controllability becomes worsened. Therefore, output pressure lowered side current value and output pressure rise side current value are measured in accordance with each output pressure Pk and an average current value thereof is set as the fundamental map. In this case, the fundamental map is represented by a bold solid curved line of FIG. 6. Hence, since the latter fundamental map based on the bold solid curved line shown in FIG. 6 can obtain a characteristic very near to that of output pressure P with actual current value, a high controllability can be obtained.

It is noted that this fundamental map is preset by actually and already measuring the output liquid pressure values and the average current value using the plurality of solenoid valves to be used for control valve unit 2. At this time, if the hysterisis characteristic such that output pressure characteristics at the pressure rise side and the pressure decrease side are linear at the low output pressure regions is present, errors may not be large even if the output pressure average value for each current value is used provided that the output pressure characteristics at the output pressure rise side and the output pressure lowered sides (in the first hysterisis loop and second hysterisis loop) in the low output pressure region are linear as the hysterisis characteristic. However, if the output pressure characteristics at the output pressure rise and lowered sides (in second and first hysterisis loops) in a low output pressure region are non-linear, it is preferable and desirable to use the current average value for each of the same output pressure actually measured values. Especially, the use of the current average value for each of the same output pressure values may be advantageous in the automatic transmission requiring a minute control in the low output pressure region. Alternatively, over the whole hysterisis characteristic exhibiting region, the fundamental maps may be preset which represents a map representing the relationship between the current average value of the current values in the first and second hysterisis loops and the output liquid pressure value.

Current I outputted from correcting section 11 serves to output the output pressure in accordance with current I via solenoid drive circuit 21 installed in control valve unit 2.

In FIG. 1, a corrective control unit 3 serves to perform the corrective control for the current value as will be described later. Corrective control unit 3 includes: a map storing section 30 having the same maps as stored in map storing section 13 within ATCU 1; an actual output pressure measuring section 31; an optimum map selecting section 32; and gain offset calculating section 33. Optimum map selecting section 32 receives a plurality of fundamental maps stored in map storing section 30. Actual output pressure measuring section 31 measures output liquid pressure outputted from solenoid drive circuit 21 and outputs the measured result to optimum map selecting section 32 and gain offset calculating section 33. Optimum map selecting section 32 compares the measured output pressure with the plurality of fundamental maps outputted from map storing section 30 to select an optimum fundamental map. It is noted that the details of the selection of the optimum map will be described later. Map information (n, j) selected by optimum map selecting section 32 is outputted to gain and offset calculating section 33 and stored into storing section 12 of ATCU 1. Gain and offset calculating section 33 calculates gain a and offset b, these being corrective terms, on the basis of the selected optimum map information and outputs the calculated gain a and offset b to storing section 12 of ATCY 1.

Figure 2:
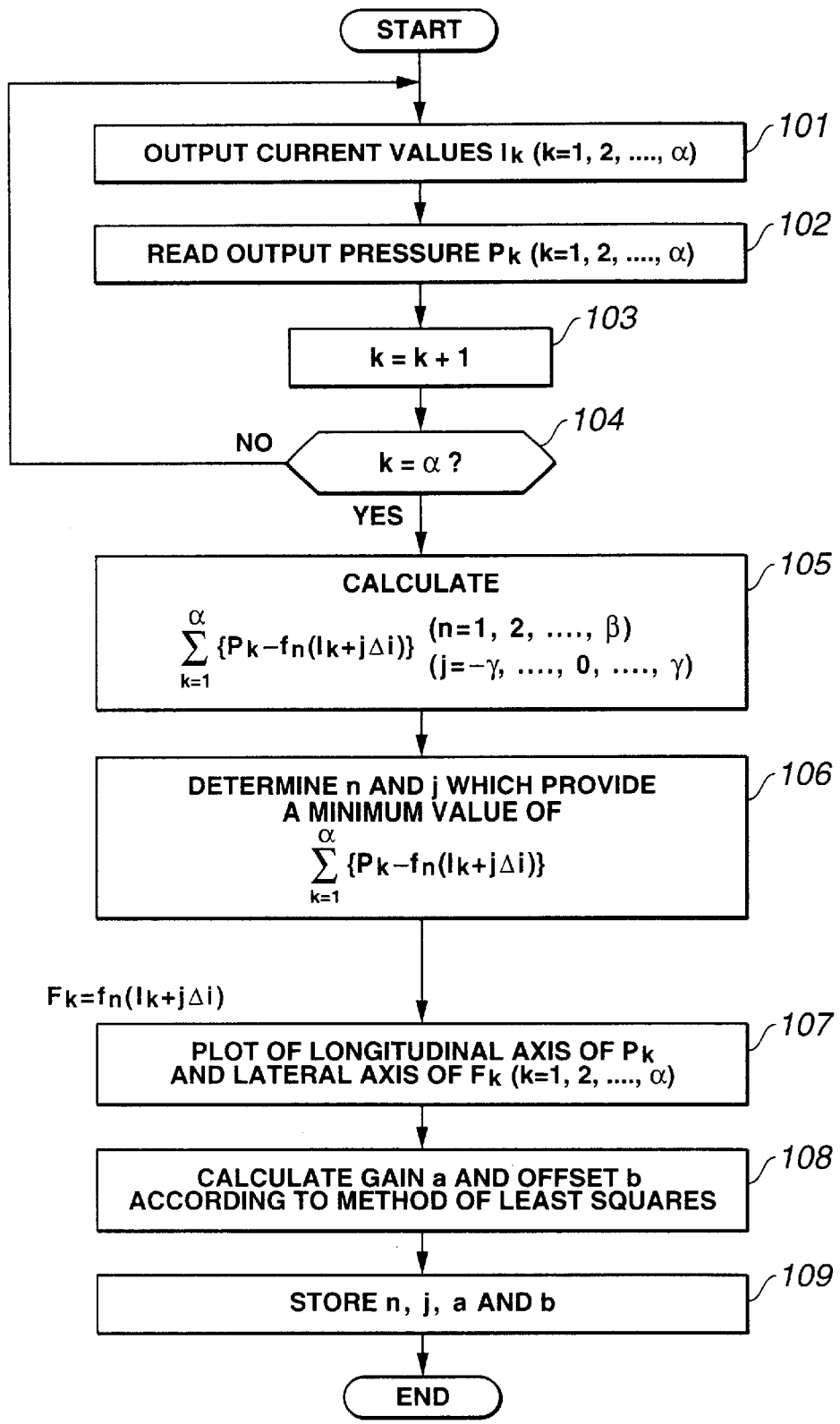
FIG. 2 is an operational flowchart for explaining an operation of the corrective control unit shown in FIG. 1 to obtain a corrective information.

Next, FIG. 2 shows an operational flowchart representing the control contents of corrective control unit 3 shown in FIG. 1.

That is to say, at a step 101, corrective control unit 3 outputs solenoid drive currents on the plurality of points Ik (k=1, 2, - - - , α) (the values may mutually be separated at the same intervals) via automatic transmission control unit ATCU 1.

At a step 102, corrective control unit 3 reads the actual output pressure values Pk (k=1, 2, - - - , α) with respect to respectively corresponding solenoid drive currents Ik. At a step 103, corrective control unit 3 increments a value of k (k=k+1) by one.

At a step 104, corrective control unit 3 determines whether k=α. If Yes at step 104 (k=α), the routine goes to a step 105. If No at step 104, the routine returns to step 101.

At step 105, corrective control unit 3 calculates a difference between actual output pressure value Pk when solenoid drive current Ik is caused to flow through solenoid drive circuit 21 and a map output value fn(Ik+jΔi) obtained from a plurality of maps and calculates a sum of the difference from k=1 to k=α: That is to say, $$\sum_{k=1}^{\alpha} \{Pk - f_n(I_k + j\Delta i)\},$$

wherein n=1, 2, - - - , β and j=-γ, - - - , 0, - - - , γ, and wherein γ denotes an arbitrary integer and Δi denotes a minimum unit when the current value I is corrected.

At the nest step 106, corrective control unit 3 determines n and j which take minimum values of the value calculated at step 105

$$\left[ \sum_{k=1}^{\alpha} \{Pk - f_n(I_k + j\Delta i)\} \right].$$

At a step 107, corrective control unit 3 performs a plotting of the output pressure values with Pk as a longitudinal axis and with Fk (=fn(Ik+jΔi)) as a lateral axis, as shown in FIG. 4.

At a step 108, corrective control unit 3 approximates the plotted points described above to a first-order function through a least square method to calculate gain a and offset b.

At a step 109, corrective control unit 3 stores values of n, j, a, and b into a memory thereof.

In details, at steps 101 through 104, corrective control unit 3 stores actually measured pressure values Pk (k=1 through α) in accordance with respectively corresponding predetermined plurality of current values Ik (k=1 through α).

Figure 3:
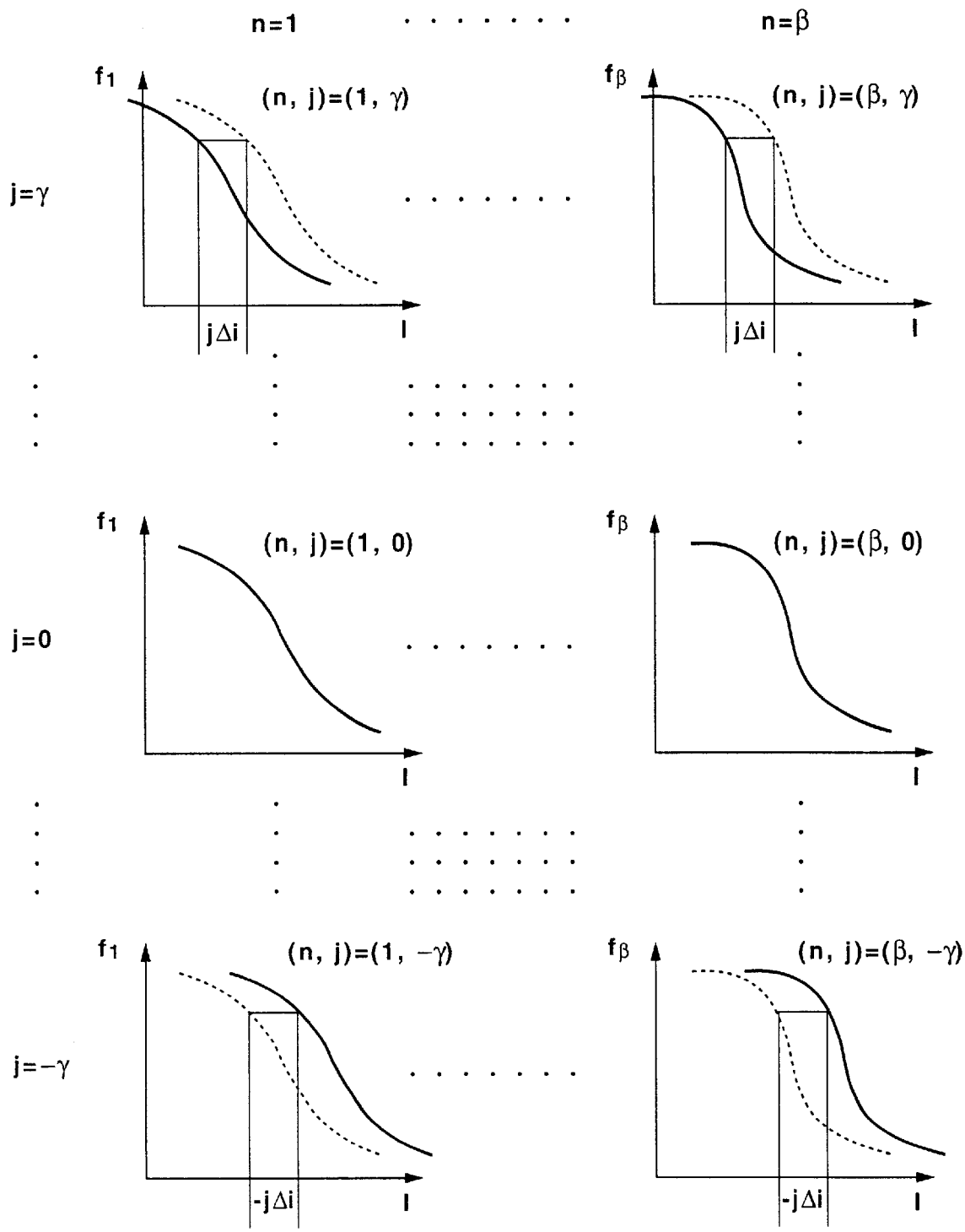
FIG. 3 is individual fundamental map views of fundamental maps and those for which current value corrections are carried out used in the corrective control unit shown in FIG. 1.

At steps 105 through 109, corrective control unit 3 at first calculates the map values fn (Ik+jΔi) in accordance with a number of current values Ik using preset n kinds of maps fn such as shown in FIG. 3. Then, corrective control unit 3 calculates the difference between actually measured output liquid pressure values Pk in accordance with each of current values Ik and the map value of fn (Ik+jΔi) and calculates and stores a sum value of the difference by α number of output pressure values (fit value). The sum is calculated by all of combinations of (n, j)=[(1, 2, - - - , β), (-γ, - - - , 0, - - - , β)] and n, j are determined which correspond to a least addition value (fittest map value and fittest offset current value). It is noted that, although fundamental maps stored in map storing section 30 are preset by n kinds (n=1 through β), the fundamental maps may be increased by means of a corrective term of jΔi which shifts the fundamental maps toward a current value direction (these are called semi fundamental maps) so that only a simple calculation processing permits the map characteristic comparison in the same case where the fundamental maps are preset further by j (j=-γ to +γ) kinds.

On the basis of (n, j) values determined at the steps described above, actually measured output liquid pressure values Pk based on each current value Ik are taken along the longitudinal axis and map values Fk {=fn(Ik+j Δi)} based on the current values Ik are plotted along the lateral axis. At step 108, the least square method is used to approximate the plotted points to the first-order function. Then, a gradient (coefficient or gain) a and a constant term (offset) b in the first-order function are determined.

FIGS. 5A and 5B show explanatory graphs for explaining a calculation process of solenoid drive current Ik using the above-described parameters (n, j, a, b). For the selected fundamental map shown in FIG. 5A, an expansion of a times is carried out in the longitudinal axis (pressure value) direction, the offset by jΔi is carried out in the longitudinal axis (current value) direction, and the offset by b in the longitudinal axis direction is carried out. Thus, the modified fundamental map as shown in FIG. 5B is obtained and the longitudinal axis can be expressed as an output pressure demand value P*. It is noted that the above-described parameters (corrective terms) (n, j, a, b) are stored in storing section 12 of ATCU 1 shown in FIG. 1. During the actual vehicular run, correcting section 11 shown in FIG. 1 calculates solenoid drive current I with respect to output pressure demand value P* using these corrective terms and outputs the calculated result to solenoid drive circuit 21.

In the corrective control system in the first embodiment, the average value of the current between the current value in its increase direction and in its decrease direction corresponding to the same output pressure actually measured value is calculated for presetting the fundamental maps since the relationship between the actually measured output pressure and the current value has the hysterisis characteristic such that the output pressure value becomes different when the current value is shifted toward its increase direction and when shifted toward its decrease direction and the relationship between the actually measured output pressure value and calculated current average value is used as fundamental map fn in the corrective control system. This permits the preparation of the fundamental map fn which is nearer to the actual output pressure characteristic. A highly accurate liquid pressure control can, then, be achieved. If the corrective control system in the first embodiment is applied to the control valve unit 2 of a direct drive type automatic transmission in which an electromagnetic linear solenoid valve is equipped, an extremely highly accurate gear shift control can be achieved.

(Second Embodiment)

Figure 8:
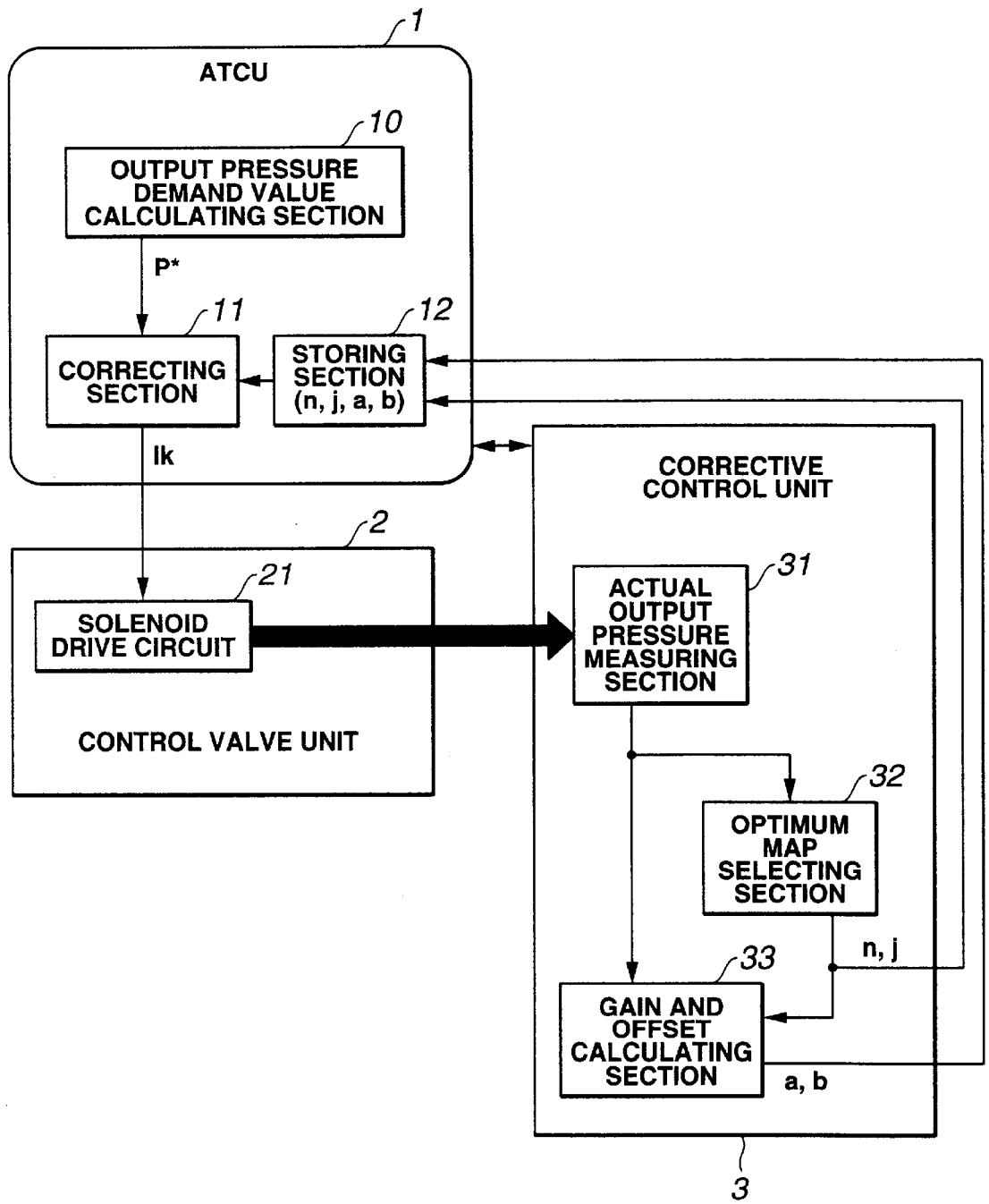
FIG. 8 is a functional block diagram of a corrective control unit communicated with an automatic transmission control unit supplying an electrical signal to a control valve unit of an automatic transmission to which a corrective control system in a second preferred embodiment according to the present invention is applicable.

FIG. 8 shows a second preferred embodiment of the corrective control system according to the present invention. It is noted that the functional block diagram of the corrective control system shown in FIG. 8 is generally the same as that shown in FIG. 1 and the same reference numerals shown in FIG. 8 as those shown in FIG. 1 are the like elements described with reference to FIG. 1. However, map storing section 13 of the first embodiment shown in FIG. 1 is incorporated into ATCU 1 but is incorporated into corrective control unit 3, viz., optimum map electing section 32 as will be described later. Corrective control unit 3 includes: actual output pressure measuring section 31; optimum map selecting section 32; and gain and offset calculating section 33. Actual output pressure measuring section 31 measures the output pressure (output liquid pressure) from solenoid drive circuit 21 and outputs the output liquid pressure actually measured value to optimum map selecting section 32 and gain and offset calculating section 33.

Optimum map selecting section 32 is provided with the plurality of fundamental maps. It is noted that semi fundamental maps to which the respectively corresponding fundamental maps are offset toward predetermined directions may not stored in optimum map selecting section 32. The map information (n, j) selected by optimum map selecting section 32 is supplied to gain and offset calculating section 33 and is stored into storing section 12 of ATCU 1. Gain and offset calculating section 33 calculates gain a and offset b which are corrective terms on the basis of the actually measured output pressure value and the selected optimum map information and stores the gain a and offset b into storing section 12. Corrective control unit 3 executes the flowchart shown in FIG. 2 in the way as described in the first embodiment. Hence, the detailed explanation thereof will herein be omitted.

Since, in the second embodiment, fundamental maps fn are offset in parallel to the current value axis by the corrective control system to form the semi fundamental maps (refer to FIG. 3), the offset in the output pressure (axis) direction (hydraulic direction) can be corrected according to coefficient a and constant term b as the result of approximation to the first-order function and the offset in the current value (axis) direction can be corrected. Thus, in the previously proposed liquid pressure control apparatus described in the BACKGROUND OF THE INVENTION, the offset in the current value direction is approximated by the first-order function and a rough correction only by means of the coefficient is carried out. However, in the second embodiment, the fundamental maps themselves are offset in the current value (axis) direction as semi fundamental maps. Thus, an extremely highly accurate correction can be made.

In addition, since the offset current value (Ik+jΔi) is inputted to fundamental map fn, it is not necessary to store the offset fundamental maps themselves into the memory, viz., optimum map selecting section 32. A simple calculation permits the comparison and search in the same way as obtaining the many maps. Since the contents to be stored in the memory are only the selected fundamental map number n, the offset current value corresponding value j, the coefficient a, and offset b, a consumption of the capacity of the memory is not extremely increased and a highly accurate correction without introduction of an increase in the manufacturing cost can be carried out.

Then, if the corrective control system according to the present invention is applied to the control valve unit of the direct drive type automatic transmission equipped with the electromagnetic linear solenoid valve, an extremely highly accurate gear shift control can be achieved. It is noted that, in each of the first and second embodiments, after the correction of the current value outputted from correcting section 11 in accordance with the output pressure demand value P* described above is ended, corrective control unit 3 may be disconnected from ATCU 1 and control valve unit 2 and a control unit defined in the claims corresponds to, for example, automatic transmission control unit ATCU 1.

The entire contents of a Japanese Patent Application No. 2002-096395 (filed in Japan on Mar. 29, 2002) and No. 2002-096396 (filed in Japan on Mar. 29, 2002) are herein incorporated by reference. The scope of the invention is defined with reference to the following claims.

What is claimed is:

1. A corrective control system for a liquid pressure control apparatus of a control valve unit, comprising:

a liquid pressure controlling section that controls an output liquid pressure of the control valve unit on the basis of a current value which is an electrical signal generated in accordance with an output pressure demand value P* determined according to a calculation process executed within a control unit;

an output liquid pressure actually measuring section that outputs respectively separated current values to a solenoid drive circuit of the control valve unit and actually measures the output liquid pressure values for the outputted respective current values;

an output pressure theoretical value calculating section that calculates an output liquid pressure theoretical value for each of the current values outputted by the actually measuring section by referring to preset fundamental maps, each fundamental map representing a relationship between the current value and the output liquid pressure theoretical value;

fundamental map presetting section that presets the fundamental maps on the basis of a hysterisis characteristic that each individual control valve unit has, the hysterisis characteristic being exhibited in such a manner that the output liquid pressure actually measured value which follows along a first hysterisis loop when the current value is increased toward a larger value is different from that which follows along a second hysterisis loop when the current value is, in turn, decreased toward a smaller value from the larger value;

a corrective term calculating section that approximates a relationship between the output liquid pressure actually measured value and the output liquid pressure theoretical value for each of the same current values to a first-order function and calculates a coefficient of the approximated first-order function and a constant thereof;

a storing section that stores the calculated coefficient and constant therein; and a correcting section that corrects the electrical signal which accords with the output liquid pressure demand value on the basis of the coefficient and constant stored in the storing section, wherein each of the fundamental maps referred to by the output liquid pressure theoretical value calculating section is a map representing a relationship between the output liquid pressure actually measured value and a current average value, the current average value being calculated to be an average of the current between the current value in the first hysterisis loop of the hysterisis characteristic and that in the second hysterisis loop thereof with respect to each of the same output pressure actually measured values.

2. A corrective control system for a liquid pressure control apparatus of a control valve unit as claimed in claim 1, wherein the fundamental map presetting section comprises a linear characteristic determining section that determines whether, in the hysterisis characteristic, both of the current value and the output liquid pressure actually measured value exhibits a linear characteristic, and wherein when the linear characteristic determining section determines that both of the current value and the output liquid pressure actually measured value exhibits the linear characteristic, an output pressure average value between the output liquid pressure actually measured value in the first hysterisis loop and that in the second hysterisis loop with respect to the same current value is calculated for each fundamental map and when the linear characteristic determining section determines that both of the current value and the output pressure actually measured value exhibits a non-linear characteristic, the average value of the current between the current value in the first hysterisis loop and that in the second hysterisis loop with respect to the same output liquid pressure is calculated for each fundamental map and wherein each of the fundamental maps represents a relationship between the current value and the output pressure average value when the linear characteristic determining section determines that both of the current value and the output liquid pressure actually measured value exhibits the linear characteristic and each of the fundamental maps represents a relationship between the output pressure actually measured value and the current average value when the linear characteristic determining section determines that both of the current value and the output liquid pressure actually measured value exhibits the non-linear characteristic.

3. A corrective control system for a liquid pressure control apparatus of a control valve unit as claimed in claim 1, wherein the current average value between the current value in the first hysterisis loop and that in the second hysterisis loop with respect to each of the same liquid pressure actually measured values is calculated for each fundamental map over a whole range of the hysterisis characteristic and wherein each of the fundamental maps is a map representing a relationship between the output liquid actually measured value and the current average value over the whole range of the hysterisis characteristic.

4. A corrective control system for a liquid pressure control apparatus of a control valve unit as claimed in claim 1, wherein the fundamental map presetting section includes the fundamental maps whose characteristics are respectively different and a plurality of semi fundamental maps which are offset from the corresponding fundamental maps toward a predetermined direction and the corrective control system further comprises: a fit value calculating section that calculates one of fit values which corresponds to a difference between the output liquid pressure actually measured value and the output liquid pressure theoretical value for each of the fundamental maps and semi-fundamental maps; and an optimum map selecting section that selects an optimum map from which an optimum value of the fit values is obtained from among the fit values calculated from each of the fundamental maps, and wherein the corrective term calculating section calculates the coefficient of the first-order function and the constant thereof on the basis of the output liquid pressure theoretical value obtained from the selected optimum map.

5. A corrective control system for a liquid pressure control apparatus of a control valve unit as claimed in claim 4, wherein each of the semi fundamental maps is offset from the fundamental maps in parallel to an axis of the current value.

6. A corrective control system for a liquid pressure control apparatus of a control valve unit as claimed in claim 4, wherein the output pressure theoretical value calculating section calculates the output liquid pressure theoretical value by inputting the current value into each of the fundamental maps and calculates the output liquid pressure theoretical value in accordance with the corresponding one of the semi fundamental maps by inputting the current value into each of the semi fundamental maps.

7. A corrective control system for a liquid pressure control apparatus of the control valve unit as claimed in claim 1, wherein a controlled object of the liquid pressure controlling section is the control valve unit of a vehicular automatic transmission that supplies a clutch pressure to an engagement element by means of a plurality of clutch pressure supplying sections in accordance with a vehicular running state and wherein each of the clutch pressure supplying sections comprises an electromagnetic linear solenoid valve which is capable of modifying the clutch pressure which is the output liquid pressure in accordance with the current value.

8. A corrective control system for a liquid pressure control apparatus of a control valve unit as claimed in claim 4, wherein the fit value calculating section comprises: a first calculating section that calculates a difference between the output liquid pressure actually measured value Pk when one of the respectively separated current values outputted by actually measured section is indicated by Ik and map output values $f_n(I_k+j\Delta i)$ derived from the fundamental maps and semi fundamental maps ($n=1, 2, ---, \beta$, $k=1, 2, ---, \alpha$); a second calculating section that calculates an addition value as follows:

$$\sum_{k=1}^{\alpha} \{Pk - f_n(I_k + j\Delta i)\},$$

wherein $j=-\gamma, ---, 0, ---, \gamma$, $\gamma$ denotes an arbitrary integer, and $\Delta i$ denotes a minimum unit to correct the current value; and a storing section that stores the addition value which is the fit value.

9. A corrective control system for a liquid pressure control apparatus of a control valve unit as claimed in claim 8, wherein the optimum map selecting section comprises: a determining section that calculates the addition value with all combinations of $(n, j)=[(1, 2, ---, \beta), (-\gamma, ---, 0, ---, \gamma)]$ and determines n and j corresponding to a minimum addition value from among the addition values of all combinations.

10. A corrective control system for a liquid pressure control apparatus of a control valve unit as claimed in claim 9, wherein the corrective term calculating section calculates a gain which corresponds to the coefficient of the first-order function and an offset b which corresponds to the first-order function, the first-order function being approximated through a least square method from plotted points of map output values $Fk[=fn(Ik+j\Delta i)]$ based on each current value Ik in a lateral axis direction of a graph with a longitudinal axis direction of each output liquid pressure actually measured value Pk.

11. A corrective control system for a liquid pressure control apparatus of a control valve unit as claimed in claim 10, wherein the liquid pressure controlling section outputs the current value to the solenoid drive circuit to control the output liquid pressure of the control valve unit according to a map of the output pressure demand value P* which is based on the selected fundamental map whose longitudinal axis direction of the output pressure demand value P* is expanded by the gain a and whose map value lateral axis direction is offset by $j\Delta i$ and whose map value longitudinal direction is offset by the constant b.

12. A corrective control method for a liquid pressure control apparatus for a control valve unit, comprising:

controlling an output liquid pressure of the control valve unit on the basis of a current value which is an electrical signal generated in accordance with an output pressure demand value P* determined according to a calculation process executed within a control unit;

outputting respectively separated current values to a solenoid drive circuit of the control valve unit;

actually measuring the output liquid pressure values for the outputted respective current values;

calculating an output liquid pressure theoretical value for each of the outputted current values by referring to preset fundamental maps, each fundamental map representing a relationship between the current value and the output liquid pressure theoretical value;

presetting the fundamental maps on the basis of a hysterisis characteristic that each individual control valve unit has, the hysterisis characteristic being exhibited in such a manner that the output liquid pressure actually measured value which follows along a first hysterisis loop when the current value is increased toward a larger value is different from that which follows along a second hysterisis loop when the current value is, in turn, decreased toward a smaller value from the larger value;

approximating a relationship between the output liquid pressure actually measured value and the output liquid pressure theoretical value for each of the same current values to a first-order function;

calculating a coefficient of the approximated first-order function and a constant thereof;

storing the calculated coefficient and constant therein; and correcting the electrical signal which accords with the output liquid pressure demand value on the basis of the stored coefficient and constant, wherein each of the fundamental maps to be referred to when calculating the output liquid pressure theoretical value is a map representing a relationship between the output liquid pressure actually measured value and a current average value, the current average value being calculated to be an average of the current between the current value in the first hysterisis loop of the hysterisis characteristic and that in the second hysterisis loop thereof with respect to each of the same output pressure actually measured values.

13. A corrective control method for a liquid pressure control apparatus for a control valve unit as claimed in claim 12, wherein, when the fundamental maps are preset, determining whether, in the hysterisis characteristic, both of the current value and the output liquid pressure actually measured value exhibit a linear characteristic, and wherein, when determining that both of the current value and the output liquid pressure actually measured value exhibits the linear characteristic, an output pressure average value between the output liquid pressure actually measured value in the first hysterisis loop and that in the second hysterisis loop with respect to the same current value is calculated for each fundamental map and, when determining that both of the current value and the output pressure actually measured value exhibit a non-linear characteristic, the average value of the current between the current value in the first hysterisis loop and that in the second hysterisis loop with respect to the same output liquid pressure is calculated for each fundamental map and wherein each of the fundamental maps represents a relationship between the current value and the output pressure average value when determining that both of the current value and the output liquid pressure actually measured value exhibits the linear characteristic and each of the fundamental maps represents a relationship between the output pressure actually measured value and the current average value when determining that both of the current value and the output pressure actually measured value exhibits the non-linear characteristic.

14. A corrective control method for a liquid pressure control apparatus for a control valve unit as claimed in claim 12, wherein, when the fundamental maps are preset, the current average value between the current value in the first hysterisis loop and that in the second hysterisis loop with respect to each of the same actually measured output liquid pressure values is calculated over a whole range of the hysterisis characteristic and wherein each of the preset fundamental maps is a map representing a relationship between the output liquid actually measured value and the current average value over the whole range of the hysterisis characteristic.

15. A corrective control method for a liquid pressure control apparatus for a control valve unit as claimed in claim 12, wherein, when the fundamental maps are preset, the fundamental maps whose characteristics are respectively different and a plurality of semi fundamental maps which are offset from the corresponding fundamental maps toward a predetermined direction are included and the corrective control method further comprises: calculating one of fit values which corresponds to a difference between the output liquid pressure actually measured value and the output liquid pressure theoretical value for each of the fundamental maps and semi-fundamental maps; and an optimum map selecting section that selects an optimum map from which an optimum value of the fit values is obtained from among the fit values calculated from each of the fundamental maps, and wherein, at the corrective term calculating step, the coefficient of the first-order function and the constant thereof is calculated on the basis of the output liquid pressure theoretical value obtained from the selected optimum map.

16. A corrective control method for a liquid pressure control apparatus of a control valve unit as claimed in claim 14, wherein each of the semi fundamental maps is offset from the fundamental maps in parallel to an axis of the current value.

17. A corrective control method for a liquid pressure control apparatus of a control valve unit as claimed in claim 15, wherein, when the output liquid pressure theoretical value is calculated, inputting the current value into each of the fundamental maps to calculate the output liquid pressure theoretical value and the output liquid pressure theoretical value in accordance with the corresponding one of the semi fundamental maps is calculated by inputting the current value into each of the semi fundamental maps.

18. A corrective control system for a liquid pressure control apparatus of a control valve unit, comprising:

liquid pressure controlling means for controlling an output liquid pressure of the control valve unit on the basis of a current value which is an electrical signal generated in accordance with an output pressure demand value P* determined according to a calculation process executed within a control unit;

output liquid pressure actually measuring means for outputting respectively separated current values to a solenoid drive circuit of the control valve unit and for actually measuring the output liquid pressure values for the outputted respective current values;

output pressure theoretical value calculating means for calculating an output liquid pressure theoretical value for each of the current values outputted by the actually measuring means by referring to preset fundamental maps, each fundamental map representing a relationship between the current value and the output liquid pressure theoretical value;

fundamental map presetting means for presetting the fundamental maps on the basis of a hysterisis characteristic that each individual control valve unit has, the hysterisis characteristic being exhibited in such a manner that the output liquid pressure actually measured value which follows along a first hysterisis loop when the current value is increased toward a larger value is different from that which follows along a second hysterisis loop when the current value is, in turn, decreased toward a smaller value from the larger value;

corrective term calculating means for approximating a relationship between the output liquid pressure actually measured value and the output liquid pressure theoretical value for each of the same current values to a first-order function and for calculating a coefficient of the approximated first-order function and a constant thereof;

storing means for storing stores the calculated coefficient and constant therein; and correcting means for correcting the electrical signal which accords with the output liquid pressure demand value on the basis of the coefficient and constant stored in the storing means, wherein each of the fundamental maps referred to by the output liquid pressure theoretical value calculating means is a map representing a relationship between the output liquid pressure actually measured value and a current average value, the current average value being calculated to be an average of the current between the current value in the first hysterisis loop of the hysterisis characteristic and that in the second hysterisis loop thereof with respect to each of the same output pressure actually measured values.

* * * * *